United States Patent
Tieke et al.

(10) Patent No.: US 7,764,591 B2
(45) Date of Patent: Jul. 27, 2010

(54) MULTILAYER OPTICAL DISC HAVING A RECORDING STACK TYPE INDICATOR

(75) Inventors: Benno Tieke, Eindhoven (NL); Jakob Gerrit Nijboer, Eindhoven (NL); Hubert Cecile Francois Martens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1278 days.

(21) Appl. No.: 10/527,120

(22) PCT Filed: Aug. 28, 2003

(86) PCT No.: PCT/IB03/03841

§ 371 (c)(1),
(2), (4) Date: Mar. 8, 2005

(87) PCT Pub. No.: WO2004/025639

PCT Pub. Date: Mar. 25, 2004

(65) Prior Publication Data

US 2006/0044995 A1      Mar. 2, 2006

(30) Foreign Application Priority Data

Sep. 11, 2002 (EP) ................... 02078718
May 24, 2003 (EP) ................... 03100750

(51) Int. Cl.
*G11B 7/24* (2006.01)
(52) U.S. Cl. ................ 369/275.1; 369/275.2

(58) Field of Classification Search ............ 369/275.1, 369/94, 275.3; 428/64.1; 430/320, 321, 430/270.1, 270.11, 270.13
See application file for complete search history.

(56) References Cited

U.S. PATENT DOCUMENTS

| | | | |
|---|---|---|---|
| 4,450,553 A * | 5/1984 | Holster et al. | 369/275.5 |
| 5,187,699 A | 2/1993 | Raaymakers et al. | |
| 6,160,787 A * | 12/2000 | Marquardt et al. | 369/275.1 |
| 6,343,060 B1 * | 1/2002 | Ko | 369/275.1 |
| 6,370,102 B1 * | 4/2002 | Mons et al. | 369/94 |
| 6,434,107 B1 * | 8/2002 | Artigalas et al. | 369/275.1 |
| 2002/0006579 A1 | 1/2002 | Ichihara | |

FOREIGN PATENT DOCUMENTS

| | | |
|---|---|---|
| EP | 0442566 A1 | 8/1991 |
| EP | 1150291 A2 | 10/2001 |
| JP | 11066622 | 9/1999 |

* cited by examiner

Primary Examiner—Tan X Dinh

(57) ABSTRACT

A multilayer record carrier of a writable type has a first recording layer (40) having a first recording stack (50,51) of a first type and a second recording layer (41) having a second recording stack (54,55) of a second type. The first and second recording stacks have different writing parameters. Each recording layer has a pre-formed recording control pattern that is readable via a laser beam for indicating the track. At least one recording control pattern comprises a recording stack type indicator for indicating the writing parameters of the second recording stack. A recording device has a control unit (20) for adjusting recording parameters in the device in dependence of the recording stack type indicator retrieved from the recording control pattern.

11 Claims, 7 Drawing Sheets

Figure 2:
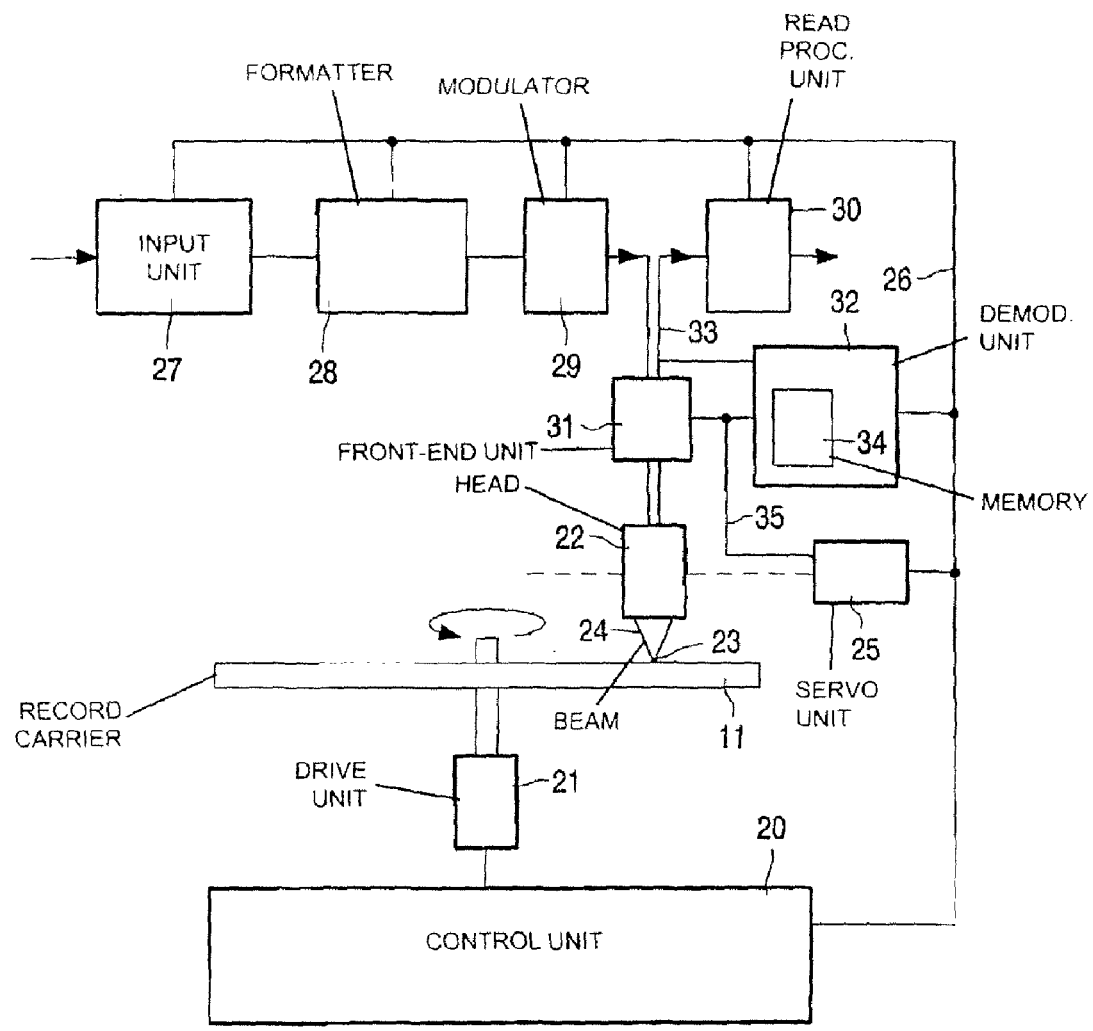

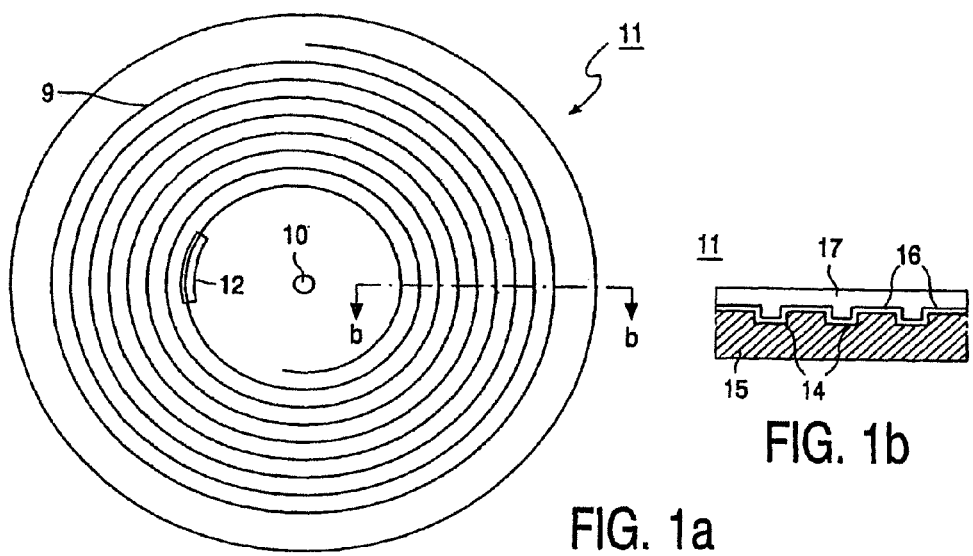
FIG. 1a
FIG. 1b
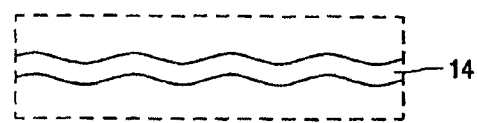
FIG. 1c

MULTILAYER OPTICAL DISC HAVING A RECORDING STACK TYPE INDICATOR

The invention relates to a record carrier of a writable type for recording information by writing marks in a track.

The invention further relates to a device for recording the record carrier.

A multilayer optical recording medium is known from Japanese Patent Application JP-11066622. Each layer is provided with a stack of materials that is sensitive to a laser beam for writing marks and (partially) reflects the beam for reading. Recently the Digital Versatile Disk (DVD) has gained market share as a medium with a much higher data storage capacity than the CD. Presently, this format is available in a read only (ROM), recordable (R) and a rewritable (RW) version. For recordable and rewritable DVD, there are at present several competing formats: DVD+R, DVD-R for recordable and DVD+RW, DVD-RW, DVD-RAM for rewritable. An issue for both the recordable and rewritable DVD formats is the limited capacity and therefore recording time because only single-stacked media are present with a maximum capacity of 4.7 GB. Note that for DVD-Video, which is a ROM disk, dual layer media with 8.5 GB capacity, often referred to as DVD-9, already have a considerable market share. However, it has become clear that a (re)writable fully compatible dual-layer disk (e.g. dual-layer DVD+RW), i.e. within the reflection and modulation specification of the dual-layer DVD-ROM, is difficult to achieve and therefore parameters of the writing-process and tracking signals of the recording stack may differ for various types of stacks on different layers. A problem is that the properties of the stack require an adaptation of the recording process in a recording device.

Therefore it is an object of the invention to provide a record carrier and a recording device wherein the recording process is adapted to the recording stack.

According to a first aspect of the invention the object is achieved with a record carrier of a writable type for recording information by writing marks in a track via a beam of radiation entering through an entrance face of the record carrier, the record carrier comprising at least a first recording layer having a first recording stack of a first type and a second recording layer having a second recording stack of a second type, the first recording layer being present at a position closer to the entrance face than the second recording layer and the first and second recording stack having different writing parameters, and at least one transparent spacer layer between the recording layers, each recording layer comprising a pre-formed recording control pattern that is readable via said beam for indicating the track, and at least one recording control pattern comprising a recording stack type indicator for indicating the writing parameters of the second recording stack.

According to a second aspect of the invention the object is achieved with a device for recording the above record carrier by writing marks in a track via a beam of radiation, the device comprising a head for providing the beam, a front-end unit for generating at least one scanning signal for detecting marks in the track and for detecting the pre-formed recording control pattern, and a demodulation unit for retrieving the recording stack type indicator from the scanning signal, and a control unit for adjusting recording parameters in the device in dependence of the recording stack type indicator retrieved from the scanning signal.

The effect of the measures is that the recording process is adapted to the recording stack due to the type of recording stack being detectable from the pre-formed recording control pattern.

The invention is also based on the following recognition. Compatibility with existing standards for read-only type record carrier like DVD-ROM requires predefined properties of both layers in a recorded disc. In addition to a dual-layer DVD+RW, it has been proposed to use dye-based dual-layer DVD+R media which can have reflection and modulation values in accordance with the dual-layer DVD-ROM standard. For fabrication of dual-layer DVD+R and dual-layer DVD+RW two processes are possible. In a first process a first recording layer L0 is fabricated on a first transparent substrate containing pregrooves. On top of L0 a transparent spacer is placed in which grooves are present, or replicated. A second recording L1 layer is fabricated on top of the grooved spacer layer and the disc is finished by applying a dummy substrate to the back of the second recording layer L1. In a second process a first recording layer L0 is fabricated on a first transparent substrate containing pregrooves. A second recording layer L1 is fabricated on a second substrate containing pregrooves. The disc is finished by attaching the two substrates containing L0 and L1 to each other with a transparent spacer layer in between. The physical structure of the L1 recording layer differs significantly for the two fabrication methods. Even a third fabrication process is possible in which L0 is build on top of L1 (both layers will be of the inverted stack type). Hence the parameters of the recording layers, e.g. the writing-process and tracking signals of the L1 recording stack, may differ for various types of stacks. In particular the inventors have seen that differences for the unrecorded layers may exist due to the type of the recording stack that may (partly) disappear after recording. By making the type of recording stack known to the recording device in advance the recording process can immediately be optimized for the recording stack of the record carrier inserted in the device.

In an embodiment of the record carrier the recording control pattern of the first recording layer comprises a recording stack type indicator for indicating the writing parameters of the second recording stack. This has the effect that the recording stack type indicator for the second layer can be retrieved from the first layer. Advantageously the first layer can always be easily read because it is located closest to the entry side of the laser beam. Moreover variation of stack type is most likely in the lower layers, while the first layer for different brands of recordable discs is expected to be less varying, e.g. comparable to single layer discs.

Further preferred embodiments of the device according to the invention are given in the further claims.

Figure 3:
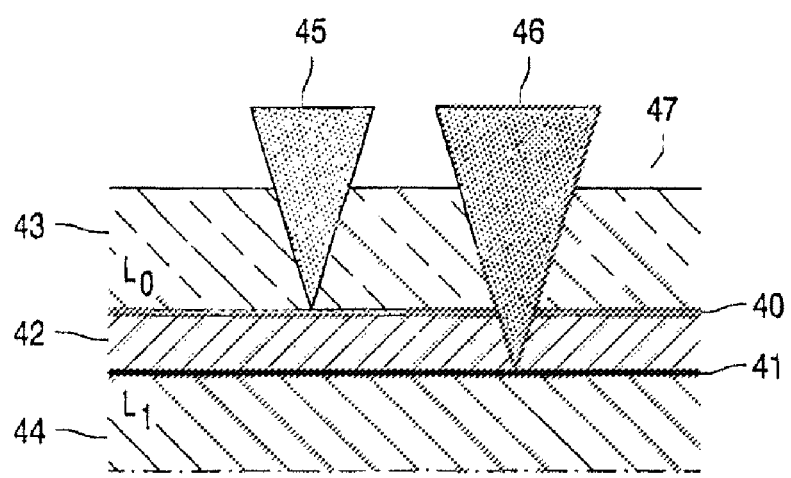
Figure 4A:
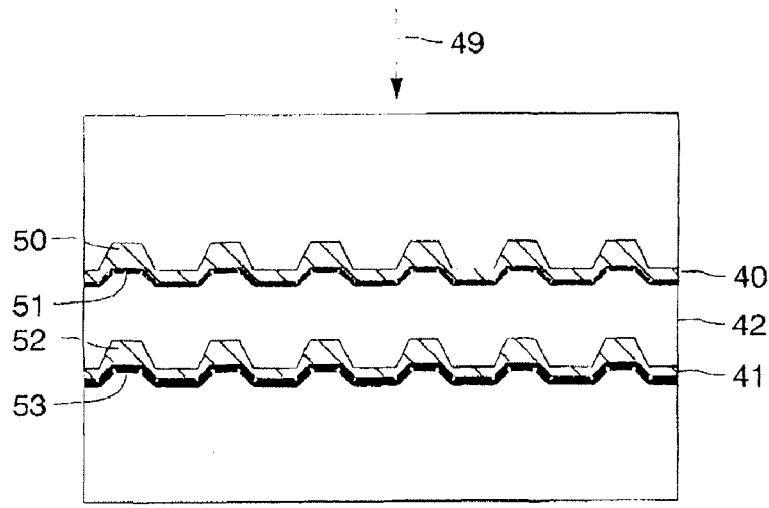
Figure 4B:
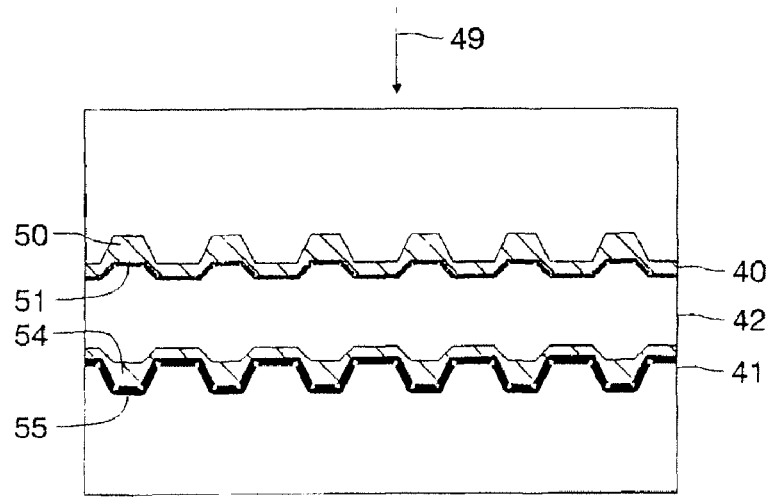
Figure 5A:
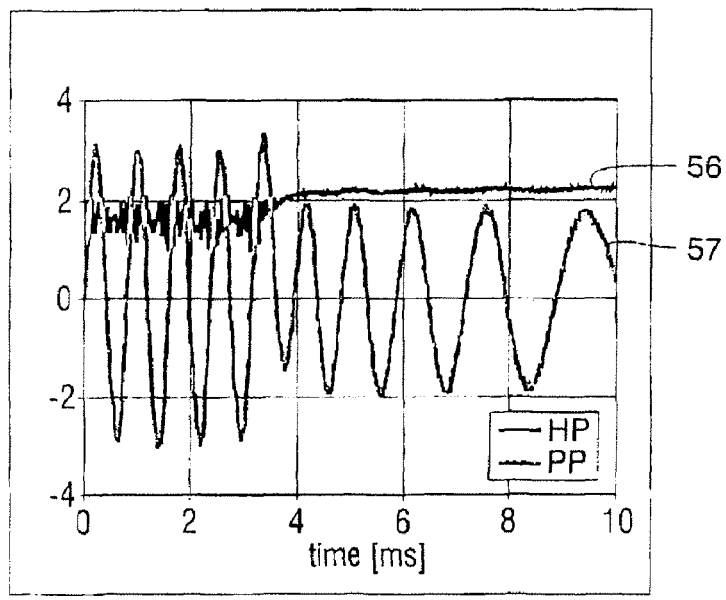
Figure 5B:
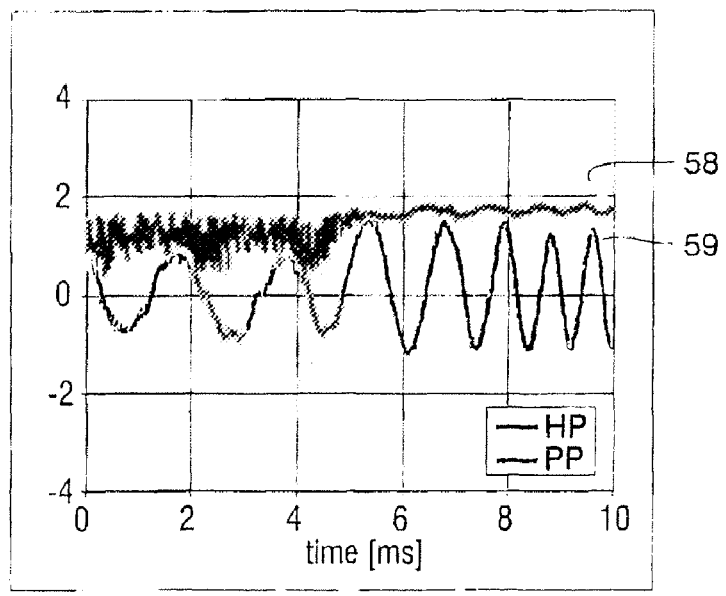
Figure 6:
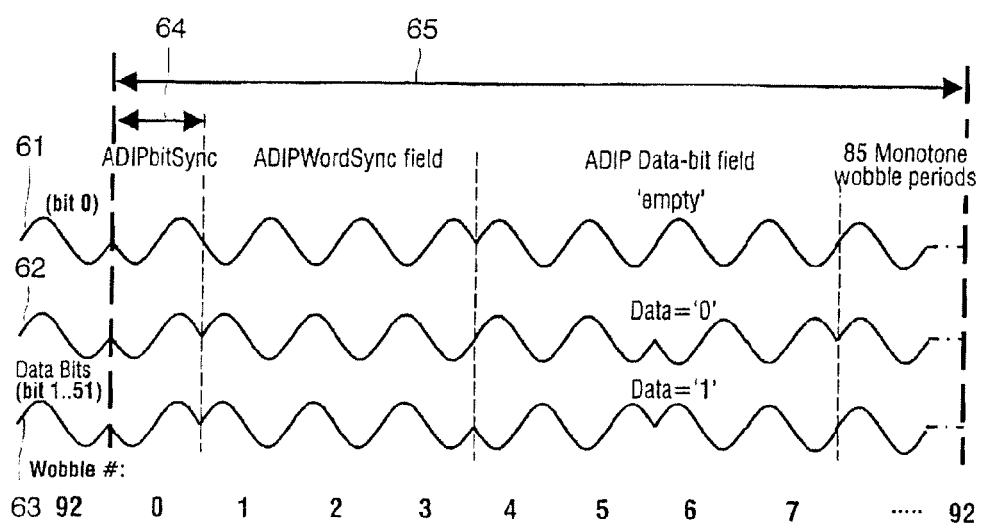
Figure 7:
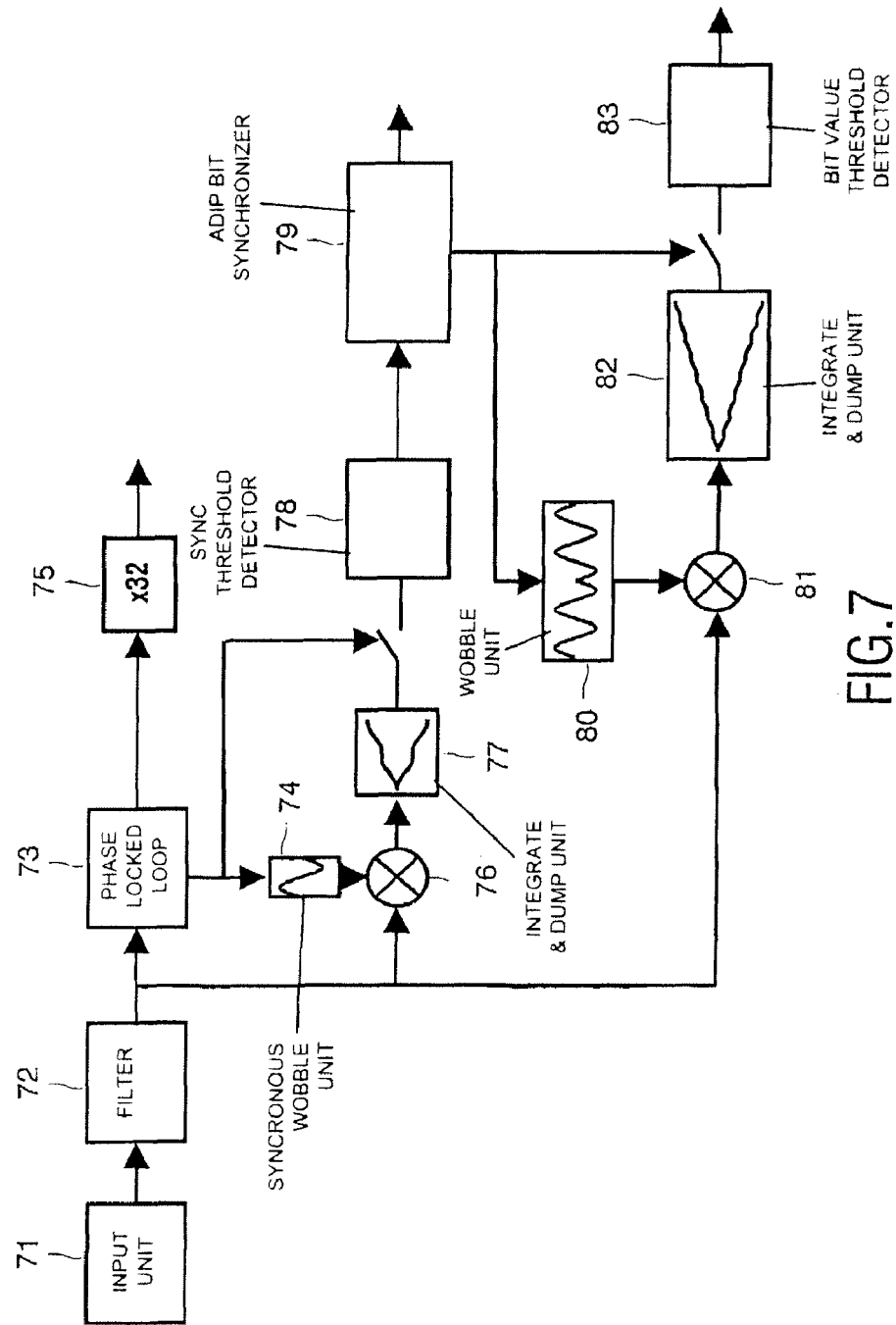

These and other aspects of the invention will be apparent from and elucidated further with reference to the embodiments described by way of example in the following description and with reference to the accompanying drawings, in which FIG. 1a shows a disc-shaped record carrier (top view), FIG. 1b shows a cross-section taken of the record carrier, FIG. 1c shows an example of a wobble of the track, FIG. 2 shows a recording device for adapting the recording process to the stack type of a record carrier, FIG. 3 shows a multilayer optical disc, FIG. 4a shows a multilayer having a recording stack of a conventional type, FIG. 4b shows a multilayer having a recording stack of an inverted type, FIG. 5a shows a push-pull signal on recorded and unrecorded parts of a conventional stack, FIG. 5b shows a push-pull signal on recorded and unrecorded parts of an inverted stack, FIG. 6 shows ADIP information in wobble modulation, and FIG. 7 shows a wobble demodulation unit.

In the Figures, elements which correspond to elements already described have the same reference numerals.

FIG. 1a shows a disc-shaped record carrier 11 having a track 9 and a central hole 10. The track 9 is arranged in accordance with a spiral pattern of turns constituting substantially parallel tracks on an information layer. The record carrier may be an optical disc having an information layer of a recordable type. Examples of a recordable disc are the CD-R and CD-RW, and the DVD+RW. The track 9 on the recordable type of record carrier is indicated by a pre-embossed track structure provided during manufacture of the blank record carrier, for example a pregroove. Recorded information is represented on the information layer by optically detectable marks recorded along the track. The marks are constituted by variations of a first physical parameter and thereby have different optical properties than their surroundings. The marks are detectable by variations in the reflected beam, e.g. variations in reflection.

FIG. 1b is a cross-section taken along the line b-b of the record carrier 11 of the recordable type, in which a transparent substrate 15 is provided with a recording layer 16 and a protective layer 17. The track structure is constituted, for example, by a pregroove 14 which enables a read/write head to follow the track 9 during scanning. The pregroove 14 may be implemented as an indentation or an elevation, or may consist of a material having a different optical property than the material of the pregroove. The pregroove enables a read/write head to follow the track 9 during scanning. A track structure may also be formed by regularly spread sub-tracks which periodically cause servo signals to occur. The record carrier may be intended to carry real-time information, for example video or audio information, or other information, such as computer data.

FIG. 1c shows an example of a wobble of the track. The Figure shows a periodic variation of the lateral position of the track, also called wobble. The variations cause an additional signal to arise in auxiliary detectors, e.g. in the push-pull channel generated by partial detectors in the central spot in a head of a scanning device. The wobble is, for example, frequency modulated and position information is encoded in the modulation. A comprehensive description of the prior art wobble as shown in FIG. 1c in a writable CD system comprising disc information encoded in such a manner can be found in U.S. Pat. No. 4,901,300 (PHN 12.398) and U.S. Pat. No. 5,187,699 (PHQ 88.002). The wobble modulation is used to encode physical addresses, for example in DVD+RW as shown in FIG. 6, while wobble demodulation is shown in FIG. 7.

User data can be recorded on the record carrier by marks having discrete lengths in unit called channel bits, for example according to the CD or DVD channel coding scheme. The marks are having lengths corresponding to an integer number of channel bit lengths T. The shortest marks that are used have a length of a predefined minimum number d of channel bit lengths T for being detectable via the scanning spot on the track that has an effective diameter, usually being roughly equal to the length of the shortest mark.

According to the invention the record carrier is a multilayer record carrier, and each recording layer comprises a preformed recording control pattern that is readable via a scanning beam for indicating the track. At least one of the recording control patterns comprises a recording stack type indicator for indicating the writing parameters of the second recording stack as discussed in detail with reference to FIGS. 4 and 5. The recording control pattern may be constituted by a pregroove having a wobble modulation encoding the recording stack type indicator. The encoded stack type indicator is schematically indicated by area 12 in FIG. 1a. It is to be noted that in practical circumstances recording control information including the stack type indicator will be encoded using a multitude of windings of the track, i.e. the area being encoded constituting an annular shaped area. The stack type indicator may be constituted by a small number of bits only indicating one of a few types, or it may include a substantial list of parameters for the recording process and recording strategy. In an embodiment the recording control information is recorded repeatedly, i.e. the area having the wobble modulation contains a multitude of copies of the stack type indicator.

FIG. 2 shows a recording device for adapting the recording process to the stack type of a record carrier. The device is provided with means for scanning a track on a record carrier 11 which means include a drive unit 21 for rotating the record carrier 11, a head 22, a servo unit 25 for positioning the head 22 on the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, e.g., a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. The focusing and tracking actuators are driven by actuator signals from the servo unit 25. For reading the radiation reflected by the information layer is detected by a detector of a usual type, e.g., a four-quadrant diode, in the head 22 for generating detector signals coupled to a front-end unit 31 for generating various scanning signals, including a main scanning signal 33 and error signals 35 for tracking and focusing. The error signals 35 are coupled to the servo unit 25 for controlling said tracking and focusing actuators. The error signals 35 are also coupled to a demodulation unit 32 for retrieving the physical addresses and recording, in memory 34, control information including the stack type indicator from the preformed recording control pattern such as wobble modulation. A detailed embodiment of wobble modulation detection is given in FIG. 7. The main scanning signal 33 is processed by read processing unit 30 of a usual type including a demodulator, deformatter and output unit to retrieve the information.

The device is provided with recording means for recording information on a record carrier of a writable or re-writable type, for example CD-R or CD-RW, or DVD+RW or BD. The recording means cooperate with the head 22 and front-end unit 31 for generating a write beam of radiation, and comprise write processing means for processing the input information to generate a write signal to drive the head 22, which write processing means comprise an input unit 27, a formatter 28 and a modulator 29. For writing information the beam of radiation is controlled to create optically detectable marks in the recording layer. The marks may be in any optically readable form, e.g. in the form of areas with a reflection coefficient different from their surroundings, obtained when recording in materials such as dye, alloy or phase change material, or in the form of areas with a direction of polarization different from their surroundings, obtained when recording in magneto-optical material.

Writing and reading of information for recording on optical disks and formatting, error correcting and channel coding rules are well-known in the art, e.g. from the CD or DVD system. In an embodiment the input unit 27 comprises compression means for input signals such as analog audio and/or video, or digital uncompressed audio/video. Suitable compression means are described for video in the MPEG standards, MPEG-1 is defined in ISO/IEC 11172 and MPEG-2 is defined in ISO/IEC 13818. The input signal may alternatively be already encoded according to such standards.

The control unit 20 controls the scanning and retrieving of information and may be arranged for receiving commands from a user or from a host computer. The control unit 20 is connected via control lines 26, e.g. a system bus, to the other units in the device. The control unit 20 comprises control circuitry, for example a microprocessor, a program memory and interfaces for performing the procedures and functions as described below. The control unit 20 may also be implemented as a state machine in logic circuits. The control unit performs the functions of retrieving the stack type indicator and adjusting the recording parameters in the device in dependence of the recording stack type indicator retrieved. In particular the control unit may be arranged for adjusting as recording parameters gain or polarity settings of the servo unit 25, or for adjusting as recording parameters a write strategy or a power control procedure for recording data on the second recording layer.

FIG. 3 shows a multilayer optical disc. L0 is a first recording layer 40 and L1 is a second recording layer 41. A first transparent layer 43 covers the first recording layer, a transparent spacer layer 42 separates both recording layers 40,41 and a substrate layer 44 is shown below the second recording layer 41. The first recording layer 40 is located at a position closer to an entrance face 47 of the record carrier than the second recording layer 41. A laser beam is shown in a first state 45 focused on the L0 layer and the laser beam is shown in a second state 46 focused at the L1 layer. Each recording layer has the pre-formed recording control pattern that encodes the recording stack type indicator, for example encoded by the wobble modulation of the pregroove.

Multilayer discs are already available as read-only prerecorded discs, such as DVD-ROM or DVD-Video. A dual layer DVD+R disc has recently been suggested, which disc should preferably be compatible with the dual layer DVD-ROM standard. The reflection levels of both layers are >18%. The L0 layer has a transmission around 50-70%. A spacer layer separates the layers with a typical thickness between 30 and 60 μm. The L1 layer has a high reflection and needs to be very sensitive. Also rewritable dual-layer discs are proposed. The L0 layer has a transmission around 40-60%. The effective reflection of both layers is typically 7% although lower and higher values are possible (3%-18%).

The two information-storage layers that are present in a dual-layer disc will, in general, have different physical characteristics. An obvious difference between the two layers is the reflection and transmission. In order to be able to access the deeper layer L1, the upper layer L0 should be sufficiently transparent at the laser wavelength. Also, to obtain sufficient read-out signals from the deeper layer L1, this layer should be highly reflecting at the laser wavelength. Other physical differences can be stack structure (inverted or conventional), groove depth, stack design, etc. A consequence of the different physical properties of L0 and L1 is that important parameters that should be known to the drive—e.g. write-strategy (type or parameters), indicative write power, target β, etc—will; in general, be different for the two layers. The parameters need to be known to a drive to ensure proper recording performance, disc handling, etc. Due to the required compatibility with existing read-only standardized record carriers, like the DVD-ROM standard, for a DVD-type dual-layer recordable (or rewritable) disc there are two options possible for the layout of the disc. These two options are referred to as 'parallel track path' (PTP) and 'opposite track path' (OTP), which indicates the direction of the spiral in both layers. In PTP discs there is one information zone per layer (two in total), while in OTP discs there is one information zone extending over the two layers.

To manufacture a recordable dual layer DVD, there are two basic options for the disc design. In both cases a first substrate with a first semi-transparent recording stack L0 is manufactured in a conventional way: spin-coating of the dye-layer on a pre-grooved 0.575 mm thick substrate followed by (sputter) deposition of a semi-transparent mirror (e.g. dielectric layer (s), thin metal layer, or a combination). For the second recording stack on recording layer L1 there are two possibilities, as illustrated by FIG. 4. It is noted that writable and rewritable optical storage media having other layer thicknesses and/or 3 or more recording layers can be produced in a similar way.

FIG. 4*a* shows a multilayer having a recording stack of a conventional type. A first L0 recording layer 40 has a recording material 50 in a pregroove pattern provided in an upper substrate. The direction of the laser beam entering the record carrier is indicated by arrow 49. A reflecting layer 51 is applied on the recording material 50. On top of the first recording layer L0, a transparent spacer-layer 42 is applied (e.g. spin-coat or PSA). The spacer layer 42 either already contains pre-grooves for the L1 recording layer, or pre-grooves for the L1 recording layer are mastered into the spacer after application to L0 (e.g. using 2P replication). On this pre-grooved spacer, the L1 recording layer is applied: a second recording material 52, e.g. spin-coating a dye, followed by a mirror material 53, e.g. (sputter) deposition of a metallic mirror. The stack deposited in this order is usually called conventional. Finally, a 0.575 mm thick dummy substrate (no grooves) is bonded to the L1 layer using e.g. the same technology as used for bonding single-layer DVD+R discs.

FIG. 4*b* shows a multilayer having a recording stack of an inverted type. A first L0 recording layer 40 and spacer 42 are provided as in FIG. 4*a*. A recording stack L1 is deposited on a separate substrate containing pre-grooves. First a reflecting material 55 is applied on the pre-grooves, and then a recording material 54 is deposited. In this case (referred to as inverted stack), the individual layers of the recording stack are deposited in inverse order compared to a conventional stack in FIG. 4*a*. The second substrate is then combined with the substrate containing the L0 stack to form the dual layer disc. A spacer layer 42 separates L0 and L1.

Since conventional and inverted stacks are different from a technological point of view they also differ in their recording parameters. These differences are especially apparent in the case of a recordable disc based on a spin-coated dye layer due to the effect of leveling, i.e. different layer thickness in the grooves and on the lands. An example is the push-pull signal (PP) for the radial error.

FIG. 5*a* shows a push-pull signal on recorded and unrecorded parts of a conventional stack. An upper curve displays the HF read signal 56, the first part (time 0-4 msec) showing signal values due to written data, the second part showing almost zero signal values due to an unrecorded part of the track. A lower curve shows the push-pull signal 57, i.e. a sine wave of which the amplitude is smaller for the unrecorded part.

FIG. 5*b* shows a push-pull signal on recorded and unrecorded parts of an inverted stack. An upper curve displays the HF read signal 58, the first part (time 0-5 msec) showing signal values due to written data, the second part showing almost zero signal values due to an unrecorded part of the track. A lower curve shows the push-pull signal 59, which has lower amplitude than the push-pull signal 57 for the conventional stack in FIG. 5a. Moreover the amplitude is larger for the unrecorded part.

Another difference between stack types is the polarity of the push-pull signal in case of inverted type L1 layers. Both on-groove and in-between-groove recording are possible, which have opposite PP-polarity. It is noted that for a conventional stack only on-groove recording is possible. Also further recording parameters, like writing power or writing pulse waveform, are different for different stack types. The different characteristics can be problematic in the handling of the discs in optical drives. For example, drives developed for recording of dual layer discs of conventional stack type may fail due to different behaviour of a disc of inverted stack type. Note that both types could still be designed in such a way that they are according to the DVD specifications after recording but differences might occur before or during recording.

The solution is to indicate the stack type of the second recording layer L1 in the disc. The type can be conventional stack or inverted stack. Other stack types may be defined also. The information on the stack type can be included in e.g. the ADIP information of the wobbled pre-groove (as shown in FIG. 6) or by other means to store the information (headers, embossed data). By introducing such a distinction of stack type in the disc, the parameter ranges defined in the standard can be adapted for each stack-type. Consequently, also optical disc drives can adapt their settings to the L1-type. For example, (gain or polarity) settings of the radial servo and the wobble detection can be adapted to the different amplitudes of the push-pull signal of the stack types. Another possibility is to adapt the write strategy or the optimum power control (OPC) procedure to record data according to the specific L1-type.

It is preferable to include the type indication of L1 not only in the L1-layer itself but in the L0-layer as well. The L0 layer is usually a conventional stack and information in this layer can therefore be read without complications under all circumstances. Moreover, the L0 layer is closer to the entrance surface and will probably be accessed and recorded first in a typical drive. By including the L1 stack-type indication already in L0, the drive can already adapt its settings before accessing L1 avoiding all possible problems related to the L1-type.

FIG. 6 shows ADIP information in wobble modulation. The wobble modulation encodes additional information that is called Address In Pregroove (ADIP) in the DVD+RW system. Each ADIP bit 65 is constituted by ADIP bit sync (one wobble period 64 corresponding to 32 channel bits), followed by a ADIP word sync field (3 wobble periods) and the ADIP Data-bit field of 4 wobble periods, followed finally by 85 monotone (i.e. not modulated) wobble periods. The Figure shows a first wobble 61 which is encoded as an ADIP word sync, in which the word sync field has inverted wobbles and the data-bit field has non modulated wobbles. Second wobble 62 encode a data bit value 0 and third wobble 63 encodes a data bit of value 1.

In an embodiment (e.g. for dual-layer DVD+R) the stack-type indication is included in the physical format information in the ADIP in the Lead-in Zone. Byte 2 of the ADIP describes the disc structure. Bit b7 and bit b3 of this Byte 2 can be used. Either of these two bits can be used for the L1-type indication (bit b4 is also free in single layer DVD+R but may be used for indicating the track path PTP vs. OTP). This part of the ADIP information will be identical in both layers, thus the information on L1-type is already available when only reading from L0. In accordance with an embodiment of the present system, the record carrier may include a pre-formed recording control pattern constituted by a pregroove indicating the position of the track. The pregroove may exhibit a wobble constituted by displacements of the pregroove in a direction transverse to the longitudinal direction of the track. The wobble may exhibit a modulation representing the recording stack type indicator.

FIG. 7 shows a wobble demodulation unit. The input unit 71 provides a push-pull signal derived from the head scanning the track. A filter 72 filters the signal by high pass and low pass filters for isolating the wobble frequency and generating a wobble signal. A phase locked loop 73 is locked to the wobble frequency, and generates via a 32× multiplier 75 the synchronous write clock for recording marks in units of channel bits. A synchronous wobble unit 74 provides a wobble clock period to multiplier 76 which also receives the wobble signal. The output of the multiplier 76 is integrated in integrate and dump unit 77, of which the output is samples via a sample switch to a sync threshold detector 78 coupled to a ADIP bit synchronizer 79 that detects the ADIP bit syncs. A second multiplier 81 is provided with a 4 wobble period signal having two inverted and two non-inverted wobbles from wobble unit 80 and the wobble signal from filter 72 on a second input for synchronous detection over 4 wobble periods. A second integrate and dump unit 82 integrates output signal of the multiplier 81, while a bit value threshold detector 83 detects the values of the encoded bits at the output of the second integrate and dump unit 82.

Although the invention has been mainly explained by embodiments using optical discs based on change of reflection, the invention is also suitable for other record carriers such as rectangular optical cards, magneto-optical discs or any other type of information storage system that has a pre-applied pattern on a writable record carrier. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software. Further, the scope of the invention is not limited to the embodiments, and the invention lies in each and every novel feature or combination of features described above.

The invention claimed is:

1. A record carrier of a writable type for recording information by writing marks in a track via a beam of radiation entering through an entrance face of the record carrier, the record carrier comprising:
   at least a first recording layer having a first recording stack of a first type and a second recording layer having a second recording stack of a second type, the first recording layer being present at a position closer to the entrance face than the second recording layer and the first and second recording stack having different writing parameters;
   at least one transparent spacer layer between the recording layers; and
   each recording layer comprising a pre-formed recording control pattern that is readable via said beam for indicating the track, and at least one recording control pattern comprising a recording stack type indicator for indicating the writing parameters of the second recording stack.

2. The record carrier as claimed in claim 1, wherein the at least one recording control pattern of the first recording layer comprises a recording stack type indicator for indicating the writing parameters of the first recording stack, and the at least one recording control pattern of the second recording layer comprises the recording stack type indicator for indicating the writing parameters of the second recording stack.

3. The record carrier as claimed in claim 1, wherein the at least one recording control pattern of the first recording layer comprises a recording stack type indicator for indicating the writing parameters of the second recording stack.

4. The record carrier as claimed in claim 1, wherein the recording control pattern comprises a recording stack type indicator that is an indicator of a polarity of a push-pull signal to be used for scanning the track.

5. The record carrier as claimed in claim 1, wherein the pre-formed recording control pattern is constituted by a pregroove indicating the position of the track, the pregroove exhibiting a wobble constituted by displacements of the pregroove in a direction transverse to the longitudinal direction of the track, and the wobble exhibiting a modulation representing the recording stack type indicator.

6. A device for recording a record carrier by writing marks in a track via a beam of radiation, the record carrier comprising:
- at least a first recording layer having a first recording stack of a first type and a second recording layer having a second recording stack of a second type, the first recording layer being present at a position closer to the entrance face than the second recording layer and the first and second recording stack having different writing parameters;
- at least one transparent spacer layer between the recording layers; and
- each recording layer comprising a pre-formed recording control pattern that is readable via said beam for indicating the track, and at least one recording control pattern comprising a recording stack type indicator for indicating the writing parameters of the second recording stack, the device comprising:
- a head for providing the beam of radiation;
- a front-end unit for generating at least one scanning signal for detecting marks in the track and for detecting the pre-formed recording control pattern;
- a demodulation unit for retrieving the recording stack type indicator from the scanning signal; and
- a control unit for adjusting recording parameters in the device in dependence of the recording stack type indicator retrieved from the scanning signal.

7. The device as claimed in claim 6, wherein the control unit is arranged for adjusting as recording parameters gain or polarity settings of a radial servo unit.

8. The device as claimed in claim 6, wherein the control unit is arranged for adjusting, as recording parameters, a write strategy or a power control procedure for recording data on the second recording layer.

9. The device as claimed in claim 6, wherein the demodulation unit is configured to retrieve the recording stack type indicator that is an indicator of a polarity of a push-pull signal to be used for scanning the track.

10. The device as claimed in claim 6, wherein the demodulation unit is configured to retrieve the recording stack type indicator that is constituted by a pregroove indicating the position of the track, the pregroove exhibiting a wobble constituted by displacements of the pregroove in a direction transverse to the longitudinal direction of the track, and the wobble exhibiting a modulation representing the recording stack type indicator.

11. The device as claimed in claim 6, wherein the demodulation unit is configured to retrieve the recording stack type indicator for the second recording stack of the second type from the first recording stack of the first type.

* * * * *